United States Patent
Ushiyama et al.

(10) Patent No.: US 8,247,921 B2
(45) Date of Patent: Aug. 21, 2012

(54) POWER SUPPLY APPARATUS FOR SLIDING DOOR

(75) Inventors: Masatoshi Ushiyama, Tokyo (JP); Yasuhiko Mukai, Tokyo (JP); Masahiro Okumura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/670,077

(22) PCT Filed: Jul. 14, 2008

(86) PCT No.: PCT/JP2008/062710
§ 371 (c)(1),
(2), (4) Date: Jan. 21, 2010

(87) PCT Pub. No.: WO2009/016953
PCT Pub. Date: Feb. 5, 2009

(65) Prior Publication Data
US 2010/0193216 A1 Aug. 5, 2010

(30) Foreign Application Priority Data
Jul. 27, 2007 (JP) ................. 2007-196603

(51) Int. Cl.
 H02G 1/00 (2006.01)
 H02G 1/06 (2006.01)
(52) U.S. Cl. ........................ 307/10.1; 307/9.1
(58) Field of Classification Search .................. 307/10.1, 307/9.1
See application file for complete search history.

(56) References Cited

U.S. PATENT DOCUMENTS

| | | | | |
|---|---|---|---|---|
| 4,606,146 A | * | 8/1986 | Jozefozak | 49/216 |
| 5,140,316 A | * | 8/1992 | DeLand et al. | 340/12.11 |
| 5,178,247 A | * | 1/1993 | Vagaggini | 191/12 C |
| 5,581,944 A | * | 12/1996 | Kornbrekke et al. | 49/28 |
| 5,649,415 A | * | 7/1997 | Pea | 59/78.1 |
| 5,896,704 A | * | 4/1999 | Neag et al. | 49/209 |
| 5,967,595 A | * | 10/1999 | Heya et al. | 296/155 |
| 5,992,919 A | * | 11/1999 | Menke | 296/155 |
| 6,036,257 A | * | 3/2000 | Manuel | 296/155 |

(Continued)

FOREIGN PATENT DOCUMENTS
EP 0977335 A2 2/2000
(Continued)

OTHER PUBLICATIONS

Chinese Office Action mailed Jun. 22, 2011 for Chinese Patent Application No. 200880024954.9, 8 pages.

(Continued)

Primary Examiner — Adi Amrany
(74) Attorney, Agent, or Firm — Turocy & Watson, LLP

(57) ABSTRACT

A power supply apparatus for sliding door includes a flat cable for electrically connecting devices on a side of vehicle body to the devices on a side of a sliding door mounted on the vehicle body so as to be able to be slid, a vehicle body side fixing portion for fixing the flat cable on the vehicle body; and a door side fixing portion for fixing the flat cable on the sliding door, wherein the flat cable is extracted from the vehicle body side fixing portion and the door side fixing portion in the substantially same direction which is substantially parallel to the sliding directions of the sliding door, and the width direction of the flat cable is maintained to be substantially vertical.

6 Claims, 7 Drawing Sheets

U.S. PATENT DOCUMENTS

| | | | | |
|---|---|---|---|---|
| 6,036,259 | A * | 3/2000 | Hertel et al. | 296/216.01 |
| 6,076,883 | A * | 6/2000 | Labonde et al. | 296/155 |
| 6,079,767 | A * | 6/2000 | Faubert et al. | 296/155 |
| 6,108,976 | A * | 8/2000 | Kato et al. | 49/360 |
| 6,161,894 | A * | 12/2000 | Chapman | 296/155 |
| 6,176,715 | B1 * | 1/2001 | Buescher | 439/162 |
| 6,321,489 | B1 * | 11/2001 | Murofushi et al. | 49/360 |
| 6,492,592 | B1 * | 12/2002 | Murofushi et al. | 174/72 A |
| 6,494,523 | B2 * | 12/2002 | Kobayashi | 296/155 |
| 6,515,229 | B2 * | 2/2003 | Aoki et al. | 174/72 A |
| 6,682,353 | B2 * | 1/2004 | Bigotto | 439/34 |
| 6,700,064 | B2 * | 3/2004 | Aoki et al. | 174/69 |
| 6,781,058 | B1 * | 8/2004 | DeCicco et al. | 174/72 A |
| 6,818,827 | B2 * | 11/2004 | Kato et al. | 174/72 A |
| 6,830,225 | B2 * | 12/2004 | Kato | 248/49 |
| 6,881,902 | B2 * | 4/2005 | Aoki et al. | 174/72 A |
| 6,916,062 | B2 * | 7/2005 | Suzuki et al. | 296/155 |
| 6,919,511 | B2 * | 7/2005 | Tsunoda et al. | 174/72 A |
| 7,042,738 | B2 * | 5/2006 | Tsubaki | 361/826 |
| 7,053,306 | B2 * | 5/2006 | Tsubaki et al. | 174/72 A |
| 7,086,687 | B2 * | 8/2006 | Aoki et al. | 296/155 |
| 7,220,129 | B1 * | 5/2007 | Nishijima et al. | 439/34 |
| 7,307,216 | B2 * | 12/2007 | Terada | 174/72 A |
| 7,369,381 | B2 * | 5/2008 | Tsukamoto et al. | 174/72 A |
| 7,381,898 | B2 * | 6/2008 | Ide | 174/72 A |
| 7,390,968 | B2 * | 6/2008 | Kogure et al. | 174/72 A |
| 7,482,538 | B2 * | 1/2009 | Kisu et al. | 174/72 A |
| 7,641,260 | B2 * | 1/2010 | Ide | 296/155 |
| 7,645,938 | B2 * | 1/2010 | Kogure et al. | 174/72 A |
| 7,730,669 | B2 * | 6/2010 | Kida et al. | 49/360 |
| 2002/0005014 | A1 * | 1/2002 | Doshita et al. | 49/360 |
| 2002/0151213 | A1 * | 10/2002 | Aoki et al. | 439/502 |
| 2004/0003543 | A1 * | 1/2004 | Kobayashi et al. | 49/360 |
| 2004/0084932 | A1 * | 5/2004 | Suzuki et al. | 296/155 |
| 2004/0108127 | A1 * | 6/2004 | Aoki et al. | 174/72 A |
| 2005/0095903 | A1 * | 5/2005 | Stenzel et al. | 439/501 |
| 2005/0264033 | A1 * | 12/2005 | Aoki et al. | 296/155 |
| 2007/0124923 | A1 * | 6/2007 | Kogure | 29/749 |
| 2009/0008991 | A1 * | 1/2009 | Ushiyama et al. | 307/10.1 |
| 2009/0020331 | A1 * | 1/2009 | Tsubaki | 174/72 A |
| 2009/0035953 | A1 * | 2/2009 | Tsubaki | 439/34 |
| 2009/0044455 | A1 * | 2/2009 | Enomoto et al. | 49/360 |
| 2010/0193216 | A1 * | 8/2010 | Ushiyama et al. | 174/117 F |

FOREIGN PATENT DOCUMENTS

| | | |
|---|---|---|
| FR | 2 893 457 A1 | 5/2007 |
| JP | 2004-34759 | 2/2004 |
| JP | 2005-178700 A | 7/2005 |
| JP | 2005-310675 A | 11/2005 |
| JP | 2006-306267 A | 11/2006 |
| JP | 2007-83854 | 4/2007 |
| JP | 2007-124721 A | 5/2007 |
| WO | 2007029705 A1 | 3/2007 |

OTHER PUBLICATIONS

Japanese Office Action mailed Aug. 5, 2011 for Japanese Patent Application No. 2007-196603, 10 pages.

Extended European Search Report dated Jan. 12, 2012 for European Patent Application No. 08 791 135.0, 5 pages.

* cited by examiner

POWER SUPPLY APPARATUS FOR SLIDING DOOR

CROSS-REFERENCE TO RELATED APPLICATIONS

This application is a US national stage filing of patent cooperation treaty (PCT) Appln. No. PCT/JP2008/062710 (WO 2009/016953), filed Jul. 14, 2008, which claims priority to Japanese patent application No. 2007-196603, filed on Jul. 27, 2007, the entire content of which are incorporated herein by reference.

TECHNICAL FIELD

This invention relates to a power supply apparatus for sliding door for supplying power and for transmitting signals from a vehicle body side of an automobile to devices within the sliding door in full time.

BACKGROUND ART

Such devices as power window motors, switches, speakers and the like are incorporated into the sliding door which is used in a one box car, a wagon car or the like. In order to supply power and to transmit commands or the like from the vehicle body side to these devices, it must be designed that a wire harness is arranged to run from the vehicle body side to the sliding door side. The wire harness which is exposed outside between the vehicle body and the sliding door to be moved while the sliding door is opening and closing in the prescribed directions (It is simply described as sliding directions below. In general, these are mostly the front direction and rear direction of the vehicle body) is required to be able to flexibly follow the movement of the sliding door without contacting the vehicle body or the sliding door.

The sliding door is mounted, for example, through three arms which are provided in the upper end, the lower end, and the rear center of the sliding door so as to be able to respectively move along rails provided on the vehicle side. In the case that the wire harness which is arranged to run between the vehicle body and the sliding door sags downward while the sliding door is opening and closing, the wire harness is likely to be wore down or to be broken by hitting the vehicle body or the sliding door, or by contacting the arm provided in the lower end.

Therefore, a round wire having high flexibility which is used as a wire harness and is received in the cable guide, for example, described in the patent document 1, is conventionally used. Mechanically, the cable guide is prevented from sagging in the vertical direction by gravity and is able to flexibly bend in the horizontal direction.

Furthermore, as a wire harness which is able to be prevented from sagging without the cable guide, for example, the flat cable described in the patent document 2 is known. Since the thickness of the flat cable is small enough in comparison to the width of the flat cable, when the flat cable is arranged to run so that the width direction corresponds to the vertical direction, the flat cable is hard to be bent in the vertical direction, but is able to be flexibly bent in the horizontal direction.

As shown in FIG. 7, in Patent Document 2, the width direction of the flat cable 900 is arranged to be the substantially vertical direction and, in the fixing portion 911 for fixing the flat cable 900 on the vehicle body 910, the flat cable 900 is arranged to run in the direction substantially vertical to the sliding directions and fixed, and, in the fixing portion 921 for fixing the flat cable 900 on the sliding door 920, the flat cable 900 is arranged to run in the direction substantially parallel to the sliding directions and fixed. The running direction of the flat cable 900 in the fixing portion 911 is arranged to be substantially vertical to the sliding directions, and hereby the flat cable 900 is enabled to flexibly move in the sliding directions inside the fixing portion 911.

Patent Document 1: Japanese Patent Application Publication 2004-34759

Patent Document 2: Japanese Patent Application Publication 2007-83854

DISCLOSURE OF THE INVENTION

Problems to be Solved by the Invention

However, in the power supply apparatus for sliding door described in the patent document 2, since the flat cable is extracted from the vehicle body in the direction substantially vertical to the sliding directions, the flat cable is largely bent in vicinity of the center portion of the length direction while the sliding door is opening and closing and the width direction of the flat cable tends to be shifted from the vertical direction in this configuration. Especially, since the flat cable is bent (in S-shape) in such a manner that the curvature is reversed, the flat cable is hard to be supported so that the width direction is maintained to be substantially vertical by the fixing portions 911 and 921.

There is a problem that, when the width direction of the flat cable is shifted from the vertical direction, the flat cable is hard to be supported because of its weight and sags downward in vicinity of the center portion of the length direction by gravity.

Furthermore, there is a problem that, in the bent portion of the flat cable, the sharper the curvature of the flat cable is, the more the flat cable tends to sag in the bent portion.

Therefore, the present invention is proposed to solve the problems described above, whose purpose is to provide the power supply apparatus for sliding door in capable of preventing the flat cable from sagging.

Means to Solve the Problems

The first embodiment of the power supply apparatus for sliding door according to the present invention includes a flat cable for electrically connecting the vehicle body to the sliding door mounted on the vehicle body so as to be slidable, a vehicle body side fixing portion for fixing the flat cable on the vehicle body, and a door side fixing portion for fixing the flat cable on the sliding door, and is characterized in that the flat cable is extracted from the vehicle body side fixing portion and the door side fixing portion in the same direction which is substantially parallel to the sliding directions of the sliding door and the width direction of the flat cable corresponds to the substantially vertical direction.

The other embodiment of the power supply apparatus for sliding door according to the present invention is characterized in that the first cable bend restricting portion and the second cable bend restricting portion for turning the flat cable are respectively provided on the respective extracting sides of the vehicle body side fixing portion and the door side fixing portion, and, when the flat cable is bent, the amount of curvature of the flat cable is restricted by the first cable bend restricting portion and the second cable bend restricting portion.

The other embodiment of the power supply apparatus for sliding door according to the present invention is characterized in that the flat cable is bent by the first cable bend restricting portion and the second cable bend restricting portion with curvature radius larger than the tolerance.

The other embodiment of the power supply apparatus for sliding door according to the present invention is characterized in that the flat cable is extracted from the vehicle body side fixing portion and the door side fixing portion in the closing direction of the sliding door.

The other embodiment of the power supply apparatus for sliding door according to the present invention is characterized in that the flat cable is extracted from the vehicle body side fixing portion and the door side fixing portion in the opening direction of the sliding door.

The other embodiment of the power supply apparatus for sliding door according to the present invention is characterized in that, when the sliding door is fully closed, the flat cable is turned by the second cable bend restricting portion and is arranged to substantially linearly run to the vehicle body side fixing portion and, when the sliding door is fully opened, the flat cable is turned by the first cable bend restricting portion and arranged to substantially linearly run to the door side fixing portion.

The other embodiment of the power supply apparatus for sliding door according to the present invention is characterized in that, when the sliding door is fully closed, the flat cable is turned by the first cable bend restricting portion and is arranged to substantially linearly run to the door side fixing portion and, when the sliding door is fully opened, the flat cable is turned by the second cable bend restricting portion and arranged to substantially linearly run to the vehicle body side fixing portion.

The other embodiment of the power supply apparatus for sliding door according to the present invention is characterized in that the flat cable is received in the corrugated tube, at least, between the vehicle body side fixing portion and the door side fixing portion.

Effect of the Invention

As described above, in use of the present invention, the power supply apparatus for sliding door in capable of preventing the flat cable from sagging can be provided.

Figure 1:
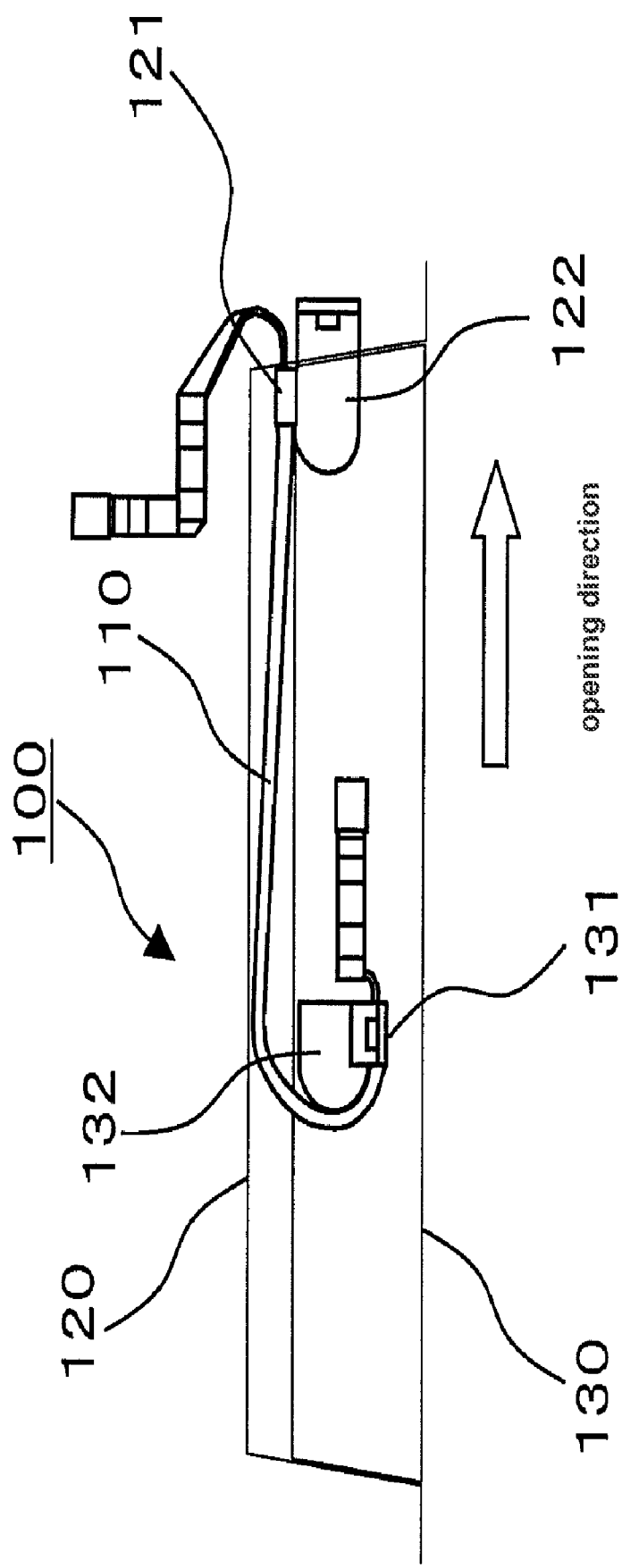
FIG. 1 is a plan view schematically illustrating the configuration of the power supply apparatus for sliding door according to the first embodiment (when the sliding door is fully closed).

EXPLANATION OF REFERENCE NUMERALS 100, 200, 300 the power supply apparatus for sliding door
110 the flat cable
120 the vehicle body
121, 321 the vehicle body side fixing portion
122, 322 the first cable bend restricting portion
130, 230 the sliding door
131, 331 the door side fixing portion
132, 332 the second cable bend restricting portion
140 the corrugated tube
141 the rib
900 the flat cable
910 the vehicle body
911, 921 connecting portion
920 the sliding door

DETAILED DESCRIPTION OF THE INVENTION

The configuration of the power supply apparatus for sliding door according to the preferred embodiment of the present invention is explained in detail with reference to the drawings. And, in order to simplify the illustration and the explanation, each component having the same function is denoted by the same reference numeral.

Figure 2:
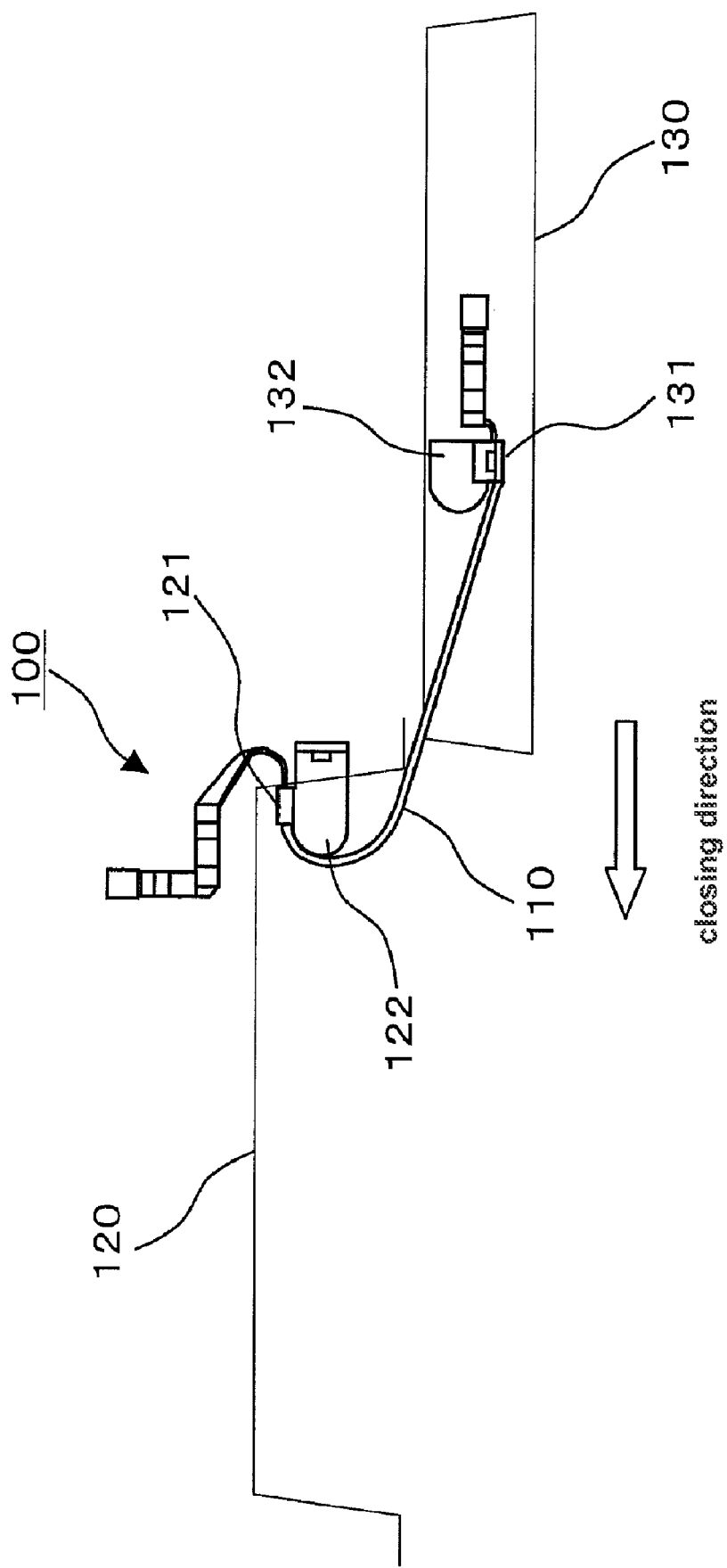
FIG. 2 is a plan view schematically illustrating the configuration of the power supply apparatus for sliding door according to the first embodiment (when the sliding door is fully opened).

FIGS. 1 and 2 are plan views schematically illustrating the configuration of the power supply apparatus for sliding door according to the first embodiment of the present invention. The status that the sliding door 130 is fully closed to the vehicle body 120 (full-closed status) and the status that the sliding door 130 is fully opened (full-opened status) are respectively shown in FIGS. 1 and 2 in which the sliding door 130 and the part of vehicle body 120 in vicinity of the sliding door 130 are illustrated. In the drawings, the left side of the vehicle body 120 is illustrated from an overhead point of view. Namely, the left sides of the drawings correspond to the front direction of the vehicle body 120 and the right sides of the drawings correspond to the rear direction of the vehicle body 120, and the sliding door 130 provided in the left side face of the vehicle body 130 is illustrated as an example. The sliding door 130 is mounted on the vehicle body 120, for example, through the arms or the like which are not depicted in the drawings so as to be slidable, and is slid in the front direction and rear direction of the vehicle body 120.

The power supply apparatus for sliding door 100 according to the present embodiment which is provided in the lower side of vehicle body of the sliding door opening portion, includes a flat cable 110, a vehicle body side fixing portion 121 and the first cable bend restricting portion 122 provided in the vehicle body 120, and a sliding door side fixing portion 131 and the second cable bend restricting portion 132 provided in the sliding door 130. The flat cable 110 is fixed by the vehicle body side fixing portion 121 and the sliding door side fixing portion 131 so that the width direction is maintained to be substantially vertical. The vehicle body side fixing portion 121 is provided in the rear side of vehicle body of the opening portion of the sliding door. And the door side fixing portion 131 is provided in vicinity of the lower center of the opening portion of the sliding door.

The flat cable 110 is extracted from the vehicle body side fixing portion 121 and the door side fixing portion 131 in the front direction of the vehicle body 120, namely, in the same direction. As shown in FIG. 1, when the sliding door 130 is fully closed, the flat cable 110 is turned by the second cable bend restriction portion 132 and is arranged to substantially linearly run from the second cable bend restricting portion 132 to the vehicle body side fixing portion 121.

And, as shown in FIG. 2, when the sliding door 130 is fully opened, the flat cable 110 is turned by the first cable bend restricting portion 122 and is arranged to substantially linearly run from the first cable bend restricting portion 122 to the door side fixing portion 131.

As shown in FIGS. 1 and 2, in the power supply apparatus for sliding door 100 according to the present embodiment, when the sliding door 130 is fully opened and closed, the bent portion of the flat cable 110 is formed by any of the first cable bend restricting portion 122 or the second cable bend restricting portion 132, and, while the sliding door 100 is opening and closing, the flat cable can be bent in U-shape in which the curvature is not reversed. Hereby a single-peaked bend is preferably formed in the mechanism all the time. However, even when the first cable bend restricting portion 122 and the second cable bend restricting portion 132 are not provided, the flat cable 110 can be bent in the substantially same way by the reaction force against bending.

Since the power supply apparatus for sliding door 100 has the configuration described above, the width direction of the flat cable 110 can be maintained to be substantially vertical between the vehicle body fixing portion 121 and the door side fixing portion 131. And, since the width direction of the flat cable 110 is maintained to be substantially vertical, the flat cable 110 can be prevented from sagging.

It is preferable that the flat cable 110 is fixed on the respective extracting sides of the vehicle body side fixing portion 121 and the door side fixing portion 131 in any direction of the sliding directions of the sliding door 130, in the same direction. In the present embodiment, the flat cable 110 is fixed in the closing direction of the sliding door 130. Since the flat cable 110 is fixed in the same direction of the sliding directions by the vehicle body side fixing portion 121 and the door side fixing portion 131, even while the sliding door 130 is opening and closing, the flat cable can be bent in a single-peaked shape, and hereby the width direction can be maintained to be substantially vertical.

And, in the full-opened status and the full-closed status of the sliding door 130, one part of the flat cable 110 in the vehicle body side fixing portion 121 or the door side fixing portion 131 is bent and the other part is maintained to be linear. The flat cable tends to sag in the bent portion. However, the other part is maintained to be linear and is hard to be bent, and thereby the bent part is supported and is prevented from sagging.

Figure 3:
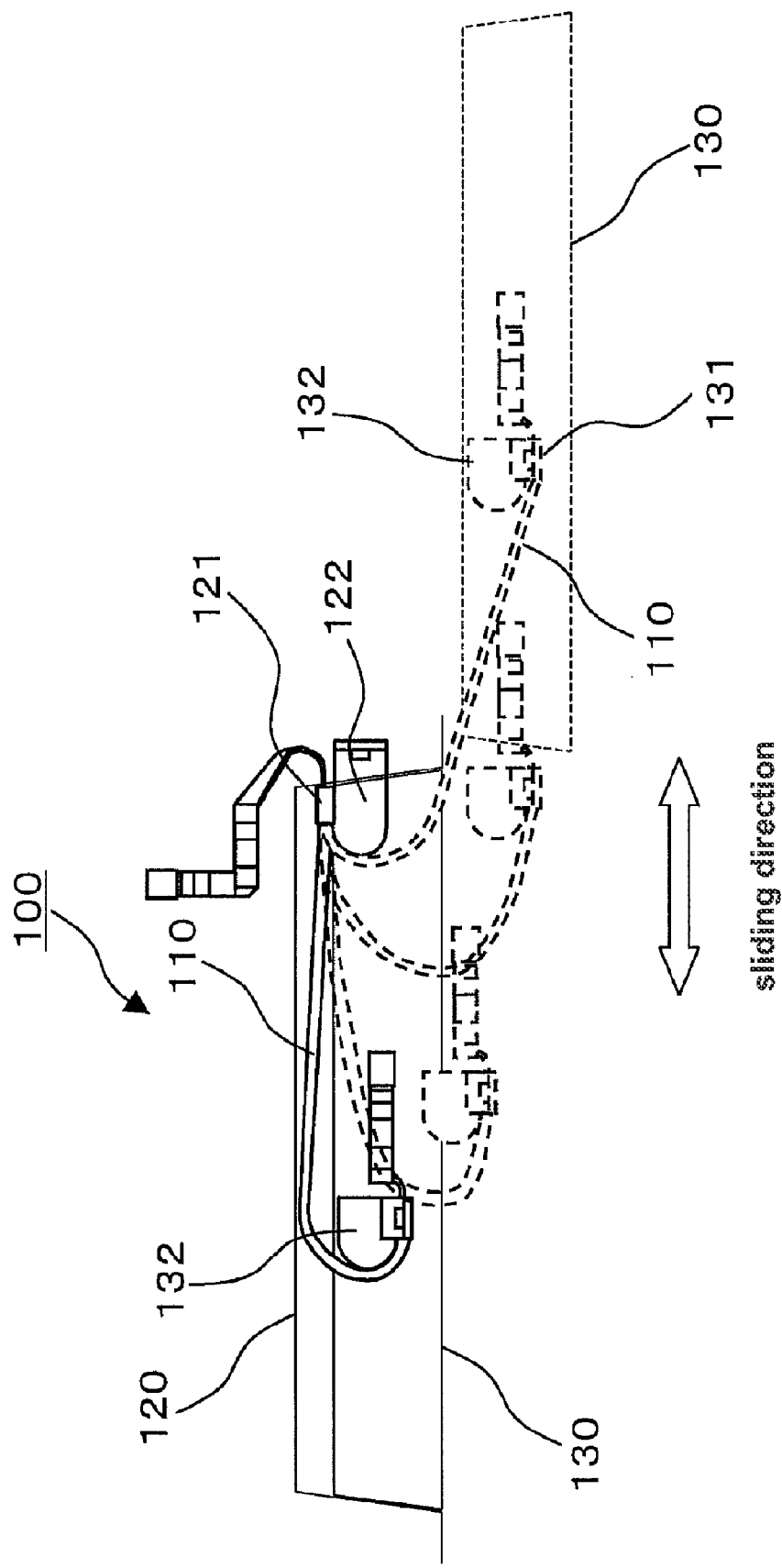
FIG. 3 is a schematic diagram illustrating the movement of the flat cable while the sliding door is opening and closing.

The status that the flat cable 110 is moved to follow the sliding door 130 while the sliding door 130 is opening and closing is schematically illustrated in FIG. 3. In the process that the sliding door 130 is slid from the full-opened status to the full-closed status, the bent portion of the flat cable 110 which is formed in periphery of the second cable bend restricting portion 132 in the full-closed status is gradually formed in periphery of the first cable restricting portion 122, and, accompanied by it, the flat cable 110 in vicinity of the second cable bend restricting portion 132 is transformed into linear shape. And, in the process described above, the bend is moderately formed more than in the full-opened status and the full-closed status. Namely, the curvature radius of the bent portion is made larger.

As shown in FIG. 3, in the power supply apparatus for sliding door 110 according to the present embodiment, a single-peaked bent portion is formed in the flat cable 110 by the first cable bend restricting portion 122 and the second cable bend restricting portion 132 in the full-opened status and the full-closed status of the sliding door 130, and, as the sliding door 130 is moved, the flat cable can be arranged to follow the movement of the sliding door 130 so that the bent portion is moved with the single-peaked shape maintained.

Since the flat cable 110 is fixed so that the width direction is substantially vertical by the vehicle side fixing portion 121 and the door side fixing portion 131, the whole length of the flat cable 110 with single-peaked shape can be maintained to be substantially vertical. Hereby the flat cable 110 is prevented from sagging downward while the sliding door 130 is opening and closing. Furthermore, in the process described above, since the bend of the flat cable 110 is moderately formed, the flat cable 110 can be prevented from sagging downward.

In the case that the flat cable 110 is bent, the minimum of the curvature radius is provided so that the curvature radius is more than the prescribed amount. In the present embodiment, since the bent portion which has smallest amount of the curvature radius is formed by the first cable bend restricting portion 122 and the second cable bend restricting portion 132, by preferably providing the respective curvature radiuses of the bending surfaces of the first cable bend restricting portion 122 and the second cable bend restricting portion 132, the flat cable 110 can be prevented from being bent with the curvature radius less than the minimum. As the preferable curvature radiuses of the respective bending surfaces of the first cable bend restricting portion 122 and the second cable bend restricting portion 132, for example, an allowable minimum of the curvature radius of the flat cable 110 can be provided.

Figure 4:
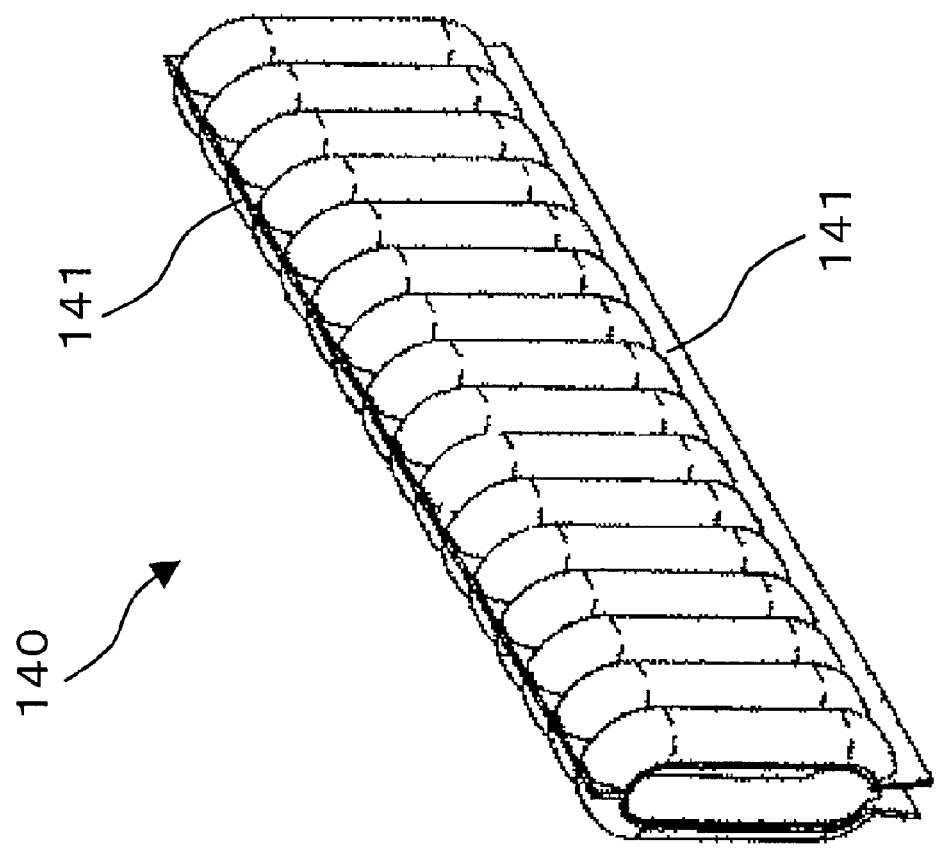
FIG. 4 is a perspective view illustrating one example of the corrugated tube.

The flat cable 110 between the vehicle body side fixing portion 121 and the door side fixing portion 131 is arranged to run outside the vehicle body when the sliding door 130 is opened, and, therefore, it can be received, for example, within a protecting tube so as to be prevented from being damaged from the outside. Especially, for example, in the case that the corrugated tube 140 shown in FIG. 4 is used as a protecting tube, since the surface is formed in corrugated shape, it can be flexibly bent in the horizontal direction, but can be hard to be bent in the vertical direction with ribs 141.

However, in the same way as the flat cable 110, when the protecting tube is tightly bent, the bent portion can sag. Especially, the corrugated tube whose surface is formed in corrugated shape tends to sag.

Accordingly, by applying the configuration of the present invention, even when the corrugated tube 140 is used, the flat cable 110 is prevented from sagging downward.

Figure 5:
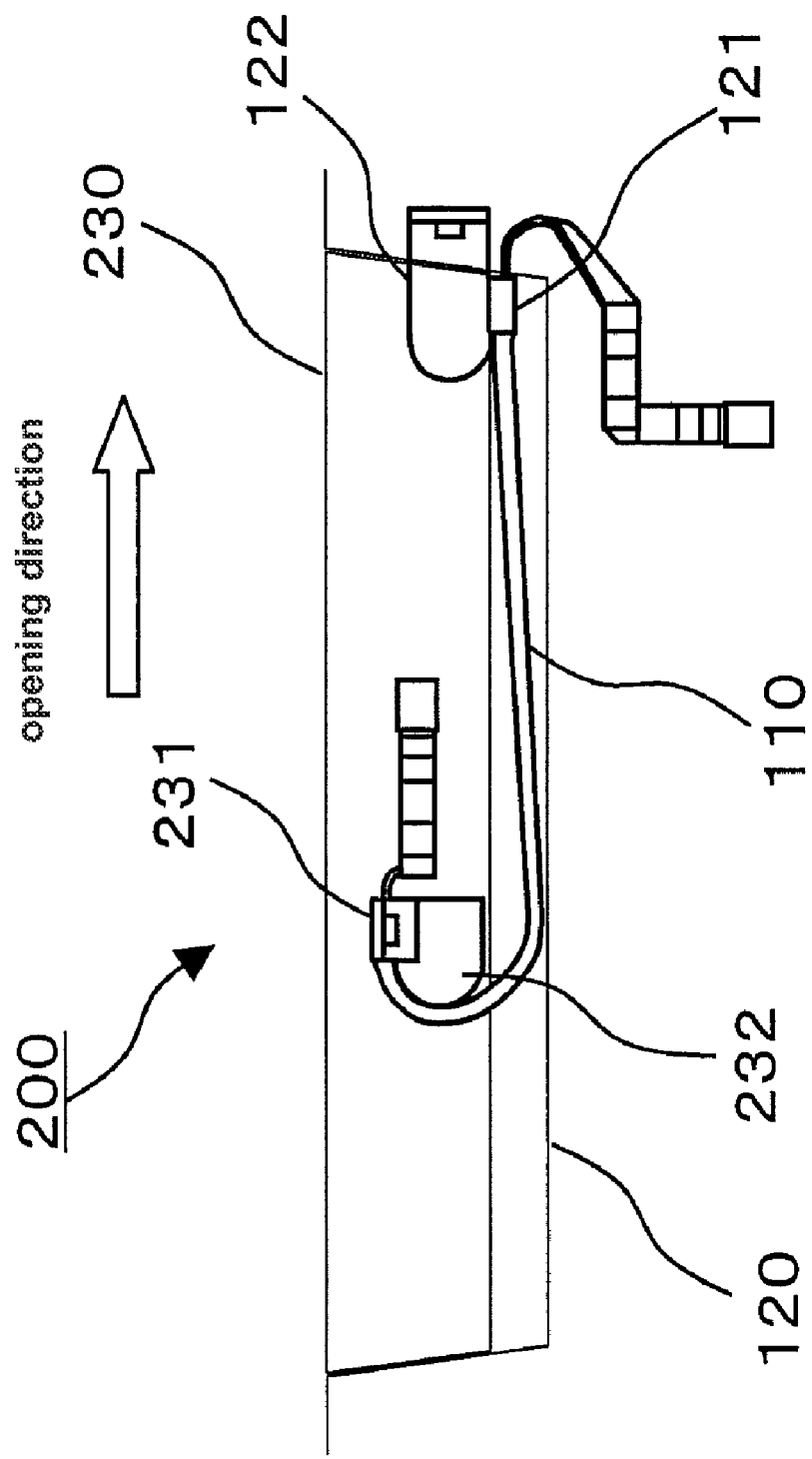
FIG. 5 is a plan view schematically illustrating the mechanism of the power supply apparatus for sliding door according to the first embodiment, which is used in the sliding door of the right side face of the vehicle body.

Although, in FIGS. 1 and 2, the example that the power supply apparatus for sliding door 100 according to the first embodiment is provided in the sliding door 130 which is mounted on the left side face of the vehicle body 120, even when the power supply apparatus for sliding door 130 is provided in the sliding door 130 which is mounted on the right side face of the vehicle body 120, the same mechanism can be applied. The plan view of the mechanism of the power supply apparatus for sliding door provided in the sliding door 230 which is mounted on the right side face of the vehicle body 120 is schematically illustrated in FIG. 5. The power supply apparatus for sliding door 200 shown in the same figure has the mechanism in which the power supply apparatus for sliding door 100 illustrated in FIG. 1 is turned upside down. Since this kind of mechanism is applied, even when the sliding door 230 is slid between the full-opened status and the full-closed status, the flat cable is prevented from sagging.

Figure 6:
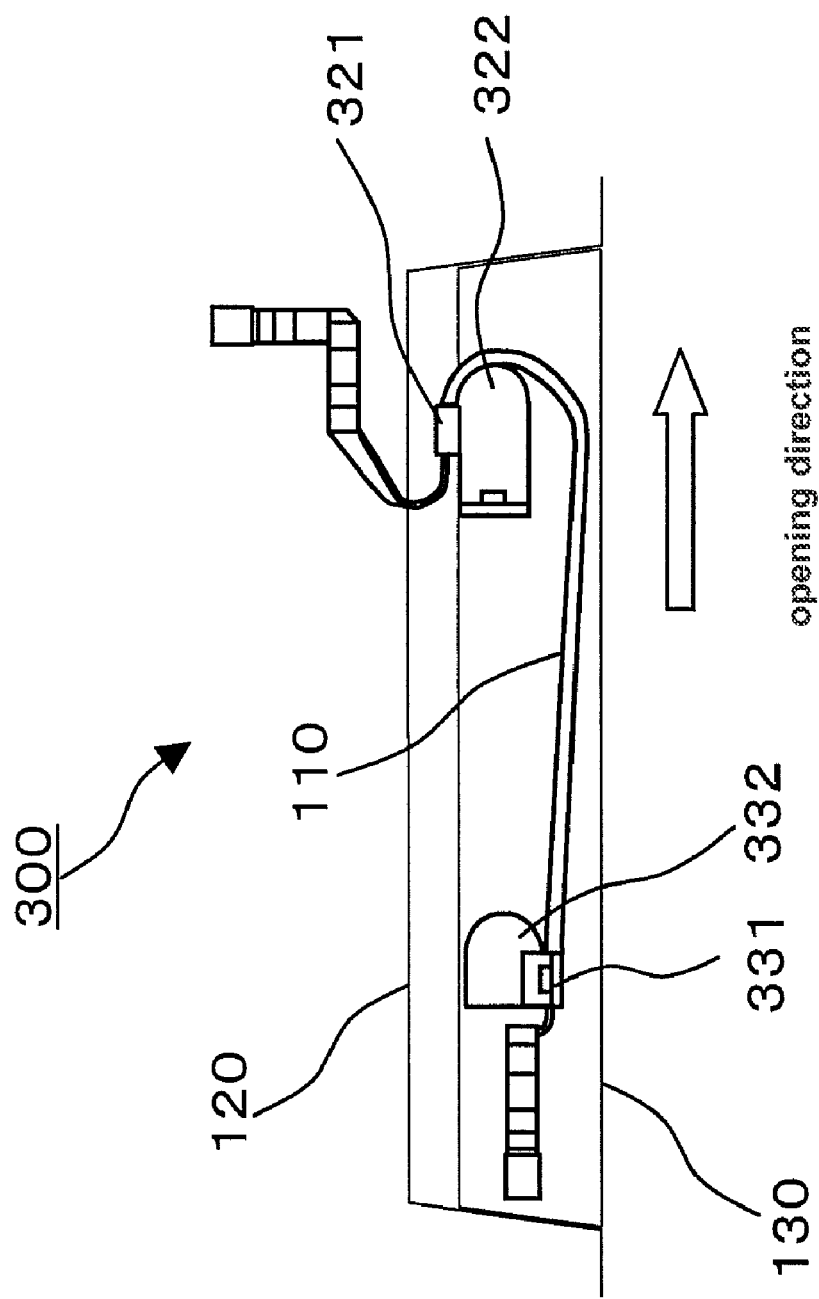
FIG. 6 is a plan view schematically illustrating the configuration of the power supply apparatus for sliding door according to the second embodiment.
Figure 7:
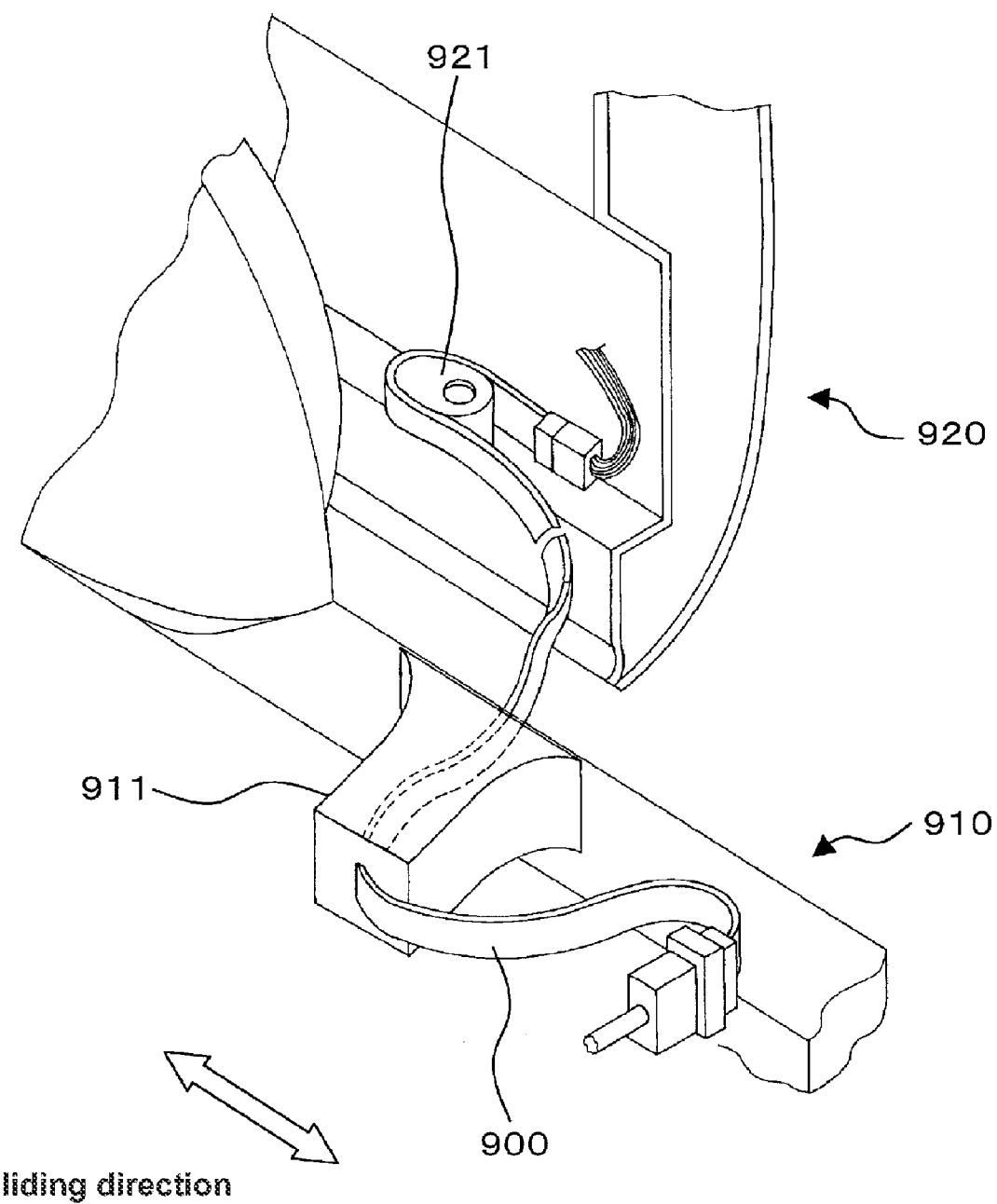
FIG. 7 is a perspective view illustrating the conventional power supply apparatus for sliding door.

The schematic configuration of the power supply apparatus for sliding door according to the second embodiment of the present invention is explained with reference to FIG. 6. FIG. 6 is plan view schematically illustrating the power supply apparatus for sliding door 300 according to the present embodiment. The power supply apparatus for sliding door 300 has the configuration in which the flat cable 110 is extracted from the vehicle body side fixing portion 321 and the door side fixing portion 331 in the direction opposite to the direction in the power supply apparatus for sliding door 100 according to the first embodiment. Namely, the flat cable 110 is extracted from the vehicle body side fixing portion 321 and the door side fixing portion 331 in the rear direction of the vehicle body 120. And the vehicle body side fixing portion 321 is provided in vicinity of the lower center of the opening portion of the sliding door, and the door side fixing portion 331 is provided in the lower front of the opening portion of the sliding door.

In the FIG. 6, the status of the power supply apparatus for sliding door 300 when the sliding door 130 is fully closed is illustrated, and, when the sliding door 130 is fully closed, the flat cable 110 is bent by the first cable bend restricting portion 322. And, when the sliding door 130 is slid to the full-opened status, the bent portion is moved from the first bend restricting portion 322 to the second bend restricting portion 332. Since the flat cable 110 is fixed by the vehicle body side fixing portion 321 and the door side fixing portion 331 so that the width direction is substantially vertical, the width direction is maintained to be substantially vertical through the whole length between the vehicle body side fixing portion 321 and the door side fixing portion 331 while the sliding door 130 is opening and closing. And, in the full-opened status and the full-closed status of the sliding door, one part is bent and the other is linear. Furthermore, while the sliding door is opening and closing, the bend of the flat cable is moderately formed. Hereby the flat cable 110 can be prevented from sagging.

The description of the present embodiment shows one example of the power supply apparatus for sliding door according to the present invention, and the present invention is not limited to this. For example, it is possible for the power supply apparatus for sliding door 100 to be provided in the upper portion of the sliding door or within the rails in which the arms are transferred. The details of the configuration, behavior and the like of the power supply apparatus for sliding door according to the present embodiment can be varied within the scope of the purpose of the present invention.

What is claimed is:

1. A power supply apparatus for a sliding door, comprising:
    a flat cable for electrically connecting devices on a side of a vehicle body to devices on a side of a sliding door mounted on said vehicle body so as to be able to be slid in sliding directions;
    a vehicle body side fixing portion for fixing said flat cable on said vehicle body;
    a door side fixing portion for fixing said flat cable on said sliding door,
    wherein said vehicle body side fixing portion holds the flat cable at a fixed position,
    wherein said flat cable is extracted from said vehicle body side fixing portion and said door side fixing portion in a substantially same direction that is substantially parallel to the sliding directions of said sliding door, and a width direction of said flat cable is maintained to be substantially vertical,
    wherein a first cable bend restricting portion having a first curved shape and a second cable bend restricting portion having a second curved shape in a substantially same direction as the first curved shape and said flat cable winds around the first cable bend restricting portion and the second cable bend restriction portion so to turn said flat cable,
    wherein the first cable bend restricting portion and the second cable bend restricting portion are respectively formed integrally with respective extracting sides of said vehicle body side fixing portion and said door side fixing portion and, when said flat cable is turned, an amount of curvature is restricted by said first cable bend restricting portion and said second cable bend restricting portion,
    wherein said flat cable is extracted from said vehicle body side fixing portion and said door side fixing portion in a closing direction of the sliding directions of said sliding door, and
    wherein, when said sliding door is fully closed, the flat cable is turned in a first direction opposite to a direction in which the flat cable is extracted by said second cable bend restricting portion and is arranged to substantially linearly run to said vehicle body side fixing portion and, when said sliding door is fully opened, said flat cable is turned in a second direction opposite to a direction in which the flat cable is extracted by said first cable bend restricting portion and is arranged to substantially linearly run to said door side fixing portion.

2. The power supply apparatus of claim 1, wherein said flat cable is bent with curvature radii larger than respective curvature radii of said first cable bend restricting portion and said second cable bend restricting portion.

3. The power supply apparatus of claim 1, wherein said flat cable is received in a corrugated tube at least between said vehicle body side fixing portion and said door side fixing portion.

4. A power supply apparatus for sliding door, comprising:
    a flat cable for electrically connecting devices on a side of a vehicle body to devices on a side of a sliding door mounted on said vehicle body so as to be able to be slid in sliding directions;
    a vehicle body side fixing portion for fixing said flat cable on said vehicle body; and
    a door side fixing portion for fixing said flat cable on said sliding door,
    wherein said vehicle body side fixing portion holds the flat cable at a fixed position,
    wherein said flat cable is extracted from said vehicle body side fixing portion and said door side fixing portion in a substantially same direction that is substantially parallel to the sliding directions of said sliding door, and the width direction of said flat cable is maintained to be substantially vertical,
    wherein a first cable bend restricting portion having a first curved shape and a second cable bend restricting portion having a second curved shape in a substantially same direction as the first curved shape and said flat cable winds around the first cable bend restricting portion and the second cable bend restriction portion so to turn said flat cable,
    wherein the first cable bend restricting portion and the second cable bend restricting portion are respectively formed integrally with respective extracting sides of said vehicle body side fixing portion and said door side fixing portion and, when said flat cable is turned, an amount of curvature is restricted by said first cable bend restricting portion and said second cable bend restricting portion, wherein said flat cable is extracted from said vehicle body side fixing portion and said door side fixing portion in an opening direction of the sliding directions of said sliding door, and wherein, when said sliding door is fully closed, the flat cable is turned in a first direction opposite to a direction in which the flat cable is extracted by said first cable bend restricting portion and is arranged to substantially linearly run to said vehicle body side fixing portion and, when said sliding door is fully opened, said flat cable is turned in a second direction opposite to a direction in which the flat cable is extracted by said second cable bend restricting portion and is arranged to substantially linearly run to said door side fixing portion.

5. A power supply apparatus for sliding door according to claim 4, wherein said flat cable is bent with curvature radii larger than respective curvature radii of said first cable bend restricting portion and said second cable bend restricting portion.

6. A power supply apparatus for sliding door according to claim 4, wherein said flat cable is received in a corrugated tube at least between said vehicle body side fixing portion and said door side fixing portion.

* * * * *

UNITED STATES PATENT AND TRADEMARK OFFICE
CERTIFICATE OF CORRECTION

| | |
|---|---|
| PATENT NO. | : 8,247,921 B2 |
| APPLICATION NO. | : 12/670077 |
| DATED | : August 21, 2012 |
| INVENTOR(S) | : Masatoshi Ushiyama et al. |

It is certified that error appears in the above-identified patent and that said Letters Patent is hereby corrected as shown below:

Title Page

Item (73) in the Assignee, please change:

Furukawa Electric Co., Ltd. (Tokyo, JP)

-- to --

Furukawa Electric Co., Ltd. (Tokyo, JP) and Furukawa Automotive Systems Inc. (Shiga, JP).

Signed and Sealed this
Nineteenth Day of November, 2013

Teresa Stanek Rea
*Deputy Director of the United States Patent and Trademark Office*